(12) United States Patent
White, II

(10) Patent No.: US 11,715,057 B2
(45) Date of Patent: Aug. 1, 2023

(54) MODELING, SIMULATION, AND PREDICTIVE ANALYSIS

(71) Applicant: NCR Corporation, Duluth, GA (US)

(72) Inventor: Alfred George White, II, Irving, TX (US)

(73) Assignee: NCR Corporation, Atlanta, GA (US)

( * ) Notice: Subject to any disclaimer, the term of this patent is extended or adjusted under 35 U.S.C. 154(b) by 1068 days.

(21) Appl. No.: 15/056,211

(22) Filed: Feb. 29, 2016

(65) Prior Publication Data

US 2017/0249568 A1 Aug. 31, 2017

(51) Int. Cl.
*G06Q 10/067* (2023.01)
*G06Q 50/12* (2012.01)

(52) U.S. Cl.
CPC .......... *G06Q 10/067* (2013.01); *G06Q 50/12* (2013.01)

(58) Field of Classification Search
None
See application file for complete search history.

(56) References Cited

U.S. PATENT DOCUMENTS

| | | | | |
|---|---|---|---|---|
| 5,557,513 | A * | 9/1996 | Frey | G06Q 10/0631 705/7.12 |
| 7,996,256 | B1 * | 8/2011 | Anand | G06Q 30/02 705/7.29 |
| 8,768,867 | B1 * | 7/2014 | Thaeler | G06Q 30/02 706/12 |
| 10,395,186 | B1 * | 8/2019 | McCullough | H04L 67/306 |
| 2004/0035643 | A1 * | 2/2004 | Dev | A47F 10/06 186/36 |
| 2004/0210621 | A1 * | 10/2004 | Antonellis | G06Q 10/087 709/200 |
| 2004/0260513 | A1 * | 12/2004 | Fitzpatrick | G06Q 30/02 702/182 |
| 2008/0162290 | A1 * | 7/2008 | Leifer | G06Q 10/06 705/15 |
| 2011/0125539 | A1 * | 5/2011 | Bollapragada | G06Q 10/043 705/7.12 |
| 2011/0246247 | A1 * | 10/2011 | McCullough | G06Q 10/087 705/5 |
| 2013/0103442 | A1 * | 4/2013 | Burks | G06Q 50/12 705/7.13 |
| 2014/0108033 | A1 * | 4/2014 | Akbay | G06Q 50/22 705/2 |
| 2014/0108035 | A1 * | 4/2014 | Akbay | G06Q 50/22 705/2 |
| 2014/0156359 | A1 * | 6/2014 | Morgan | G06Q 20/202 705/13 |
| 2014/0257889 | A1 * | 9/2014 | Ashley, Jr. | G07C 11/00 705/7.11 |

(Continued)

OTHER PUBLICATIONS

NCR Aloha Guest Manager; 2012 (Year: 2012).*

*Primary Examiner* — Deirdre D Hatcher
(74) *Attorney, Agent, or Firm* — Schwegman Lundberg & Woessner, P.A.

(57) ABSTRACT

A retail environment is modeled and simulated based on aggregated operational data. Real-time aggregated data for operations of the retail environment is detected and predictive adjustments to the retail environment are provided for making one or more changes to the retail environment based on the modeled and simulated environment.

13 Claims, 4 Drawing Sheets

(56) References Cited

U.S. PATENT DOCUMENTS

2014/0278688 A1* 9/2014 Sullivan ........... G06Q 10/06312
   705/7.22
2015/0199627 A1* 7/2015 Gould ................ G06Q 10/0631
   705/7.12
2016/0342929 A1* 11/2016 Tanaka ............. G06Q 10/06314

* cited by examiner

MODELING, SIMULATION, AND PREDICTIVE ANALYSIS

BACKGROUND

Many systems are chaotic and random in nature, or at least appear to human perception to be random and chaotic. For example, consider a restaurant system that includes a variety of resources (human and non-human). Operational efficiency and effectiveness of the restaurant depends on having a correct (not too few and not too many) resources in advance of use or need of those resources to handle customer traffic and maximize income efficiently.

In the restaurant example, information relevant to resources can include anything from: having the correct number of staff members on duty, allowing for the correct number of reservations to be booked, opening or closing sections of the site depending on service levels, and many more. Overall service site performance can suffer greatly from simply not having enough bussers available during a shift change. The point might appear obvious, but it is very difficult and humanly impossible to quantify exactly how much delay it adds to a guest's visit to the site.

A site operator might be aware that allowing too many reservations close to one another could overwhelm the kitchen staff, but not know how much of an increase in time this results in for food delivery to the customers. Also, gut feelings and past experiences may not be available to new or inexperienced site operators. Furthermore, even experienced site operators can experience difficulties in optimizing site performance when the site is saturated with customers. For example, an experienced site operator, in attempting to reduce customer wait times at a saturated site, can reduce site income by allowing too many small parties of customers to sit at oversized tables for those small parties (leaving unoccupied chairs at those oversized tables). Moreover, an experienced site operator might have little way of knowing how adding or removing a particular table would affect sire performance.

Essentially, site operations are managed based on experience (intuition) of the site operators and guesses made by the site operators; relying on experience is limited and flawed in many respects. In fact, experience may not even realize variables or factors that are of import when managing the sites. Therefore, conventional reliance on experience and gut feelings to optimize site operations is inefficient, untimely, and results in flawed decisions when managing a site.

SUMMARY

In various embodiments, methods and a modeling, simulation, and predictive analysis for a retail environment are presented.

According to an embodiment, a method for modeling, simulation, and predictive analysis for a retail environment is provided. Specifically, in an embodiment, activity of a physical environment is modeled and anticipated activity is simulated within the modeled physical environment. Next, a predictive result for the physical environment is provided based on the simulated anticipated activity.

DETAILED DESCRIPTION

Figure 1:
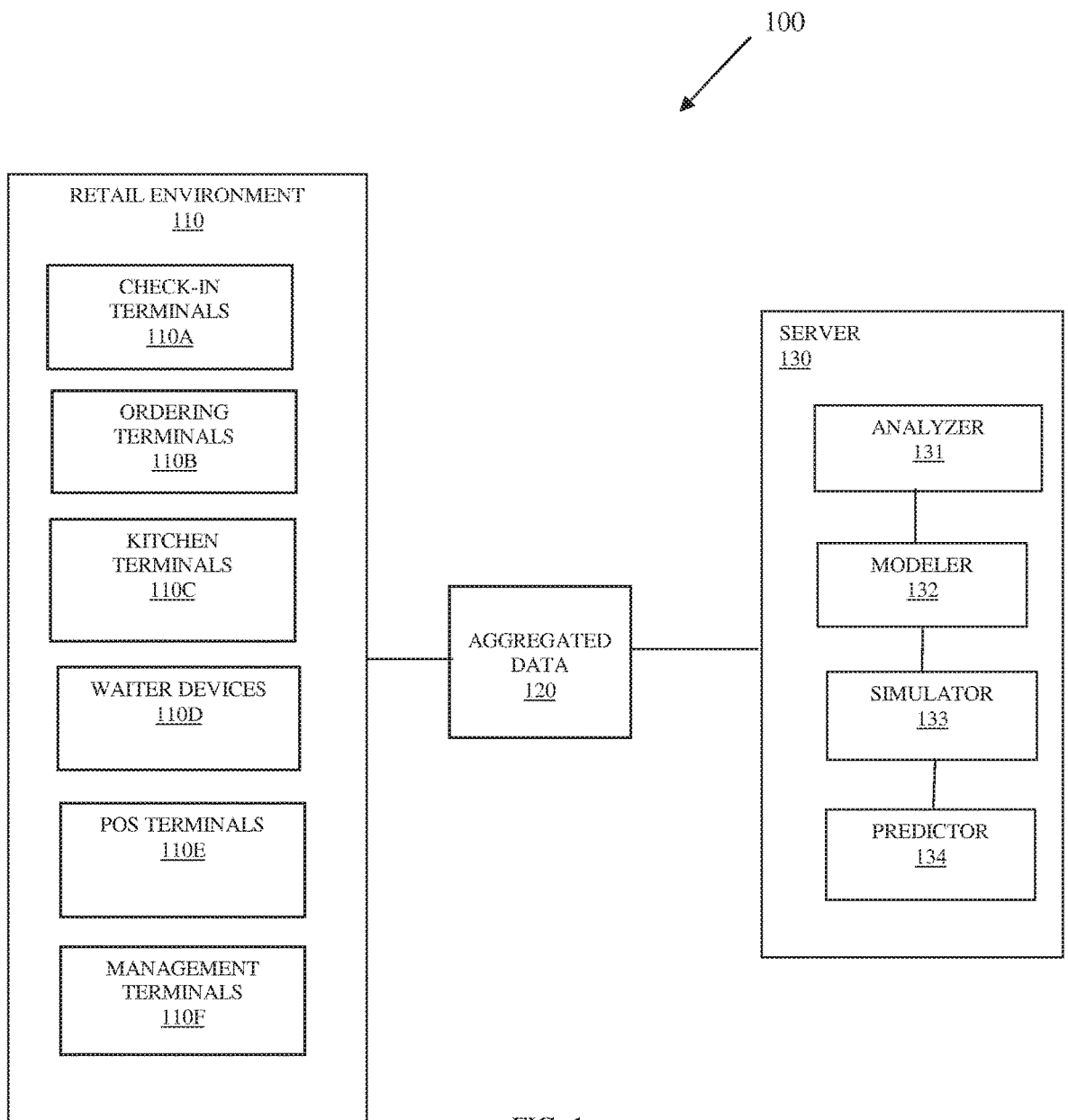
FIG. 1 is a diagram of a system for modeling, simulation, and predictive analysis for a retail environment, according to an example embodiment.

FIG. 1 is a diagram of a system 100 for modeling, simulation, and predictive analysis for a retail environment, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the modeling, simulation, and predictive analysis for retail environments presented herein and below.

Moreover, various components are illustrated as one or more software modules, which reside in non-transitory storage and/or hardware memory as executable instructions that when executed by one or more hardware processors perform the processing discussed herein and below.

The techniques, methods, and systems presented herein and below for modeling, simulation, and predictive analysis of a retail environment can be implemented in all, or some combination of the components shown in different hardware computing devices having one or more hardware processors.

The system 100 includes a retail environment 110, an aggregated data store 120, and a server 130.

The retail environment 110 includes a variety of devices/terminals, such as but not limited to, check-in terminals 110A, ordering terminals 110B, kitchen terminals 110O, waiter devices (can be handheld devices and/or standalone terminals) 110O, Point-Of-Sale (POS) terminals 110E, and management terminals 110F.

It is noted that each of the terminals/devices 110A-110F may communicate with one another either wirelessly or through the server 130. That is, the retail operational interface (not shown in the FIG. 1) is any conventional operational interface and resides on the server. The operational interface is used to collect data for transactions and operations of the retail environment 110 and to manage transaction and operations of the retail environment 110.

In an embodiment, the conventional operational interface is modified to capture additional types of data relevant to or for the transactions and operations of the retail environment 110. Such additional types of data may include, demographic information of customers of the retailer, such as customer age ranges (20s, 30s, 40s, etc.).

In an embodiment, the conventional operation interface is modified to retail existing types of data that may be otherwise discarded and not retained in the aggregated data store 120.

The terminals/devices 110A-110F capture data, such as customer check-in time, number of customers in a party, demographics of customers, the time the customer was actually seated, the waiter identifier for the waiter that is to server the customer, a table identifier for the table the customer was seated at, the time the customer order was placed, the time the kitchen completed the order, the time the customer bill was printed, the time the customer paid the bill, what was ordered in terms of food and drink, total of the bill, kitchen staff identifiers for kitchen staff that prepared the order, bus staff identifiers for busing staff working when the customer was in the retail environment 110, the time the table was ready for another customer (table bussed) after the customer paid the bill, and other data (metrics) captured by the operational interface from the terminals/devices 110A-110F.

It is noted that any conventional operation interface that presently discards or does not retain the data listed above is modified to retain such data in the aggregated data store 120 and for extended periods of time than for what they may presently retain such data (if such data is being retained). In an embodiment, the aggregated data store retains anywhere from 3-8 weeks of operational data for the retail environment 110 and data beyond that is offloaded to another data store for historical analysis.

Once a sufficient (at least 3-8 weeks' worth of data is captured in the aggregated data store 120. The analyzer 131 processes that data to condense the data into normalized metrics, such as, but not limited to: seating efficiency/utilization, table efficiency/utilization, employee efficiency/utilization, traffic flow rates and models, and the like. The traffic flow rates are based on a pattern for a given: day of week and calendar day within a given period of time (such as a 30 minute time sliding window—this can be configured to any smaller or larger sliding time frame). Traffic refers to the number of customers being served by the retail establishment within the given period of time and may also break down the customers into party size (number of customers that are together).

The aggregated data 120 also includes an electronic version of the retail environment 110 physical resources available, such as number of available tables, table capacity (number of customers that table can serve at once), number of chairs available, table types, physical layout of the retail environment 110, known layout patterns (for arrangements of the tables and chairs within the physical layout), and the like.

The analyzer 131 can associate/link the metrics processed from the aggregated data (for at least three to eight weeks' worth of data) with the physical resources and given layout of the retail environment 110, such that table efficiency/utilization, the traffic flow rates and models, and other of the metrics are linked to a given layout pattern for the retail environment 100.

The modeler 132 receives the metrics and the links to the layout patterns from the analyzer 131. The modeler 132 processes the metrics and the links to generate models and flow behaviors for the environment 100. That is, given a particular day of the week or calendar day during a given time frame (for example 5 p.m. to 7 p.m.) the metrics and links show a model with customer wait times of more than 10 minutes, a table utilization and staff utilization of 80%, and a profit of 25%. The different detected flow behaviors and models can result in duplicates, such that given days of the week or calendar days for given time frames are similar or within a predefined tolerance. These duplicate behaviors can be presented as a single module or set of flow behaviors by the modeler 132.

The simulator 133 processes the different models and flow behaviors with simulated operational data that changes different traffic rates for a given model and utilizes different physical layouts for the environment 100 with different numbers of staff present to generate predictive behavior in terms of utilization, wait times, and profitability. This can be done based on the available models and flow patterns and what is known about each of them (physical layout, number of staff, etc.).

The predictor 134 interfaces with the simulator 133 and provides the simulated data to receive a given predictive behavior for the simulated data. The predictive behavior is then presented (through an interface) to the management terminal 110F as suggested changes to make in terms of staff numbers and physical layout to maximize profitability for a given traffic pattern, day of the week, time of day, etc.

In an embodiment, an interface provides a visual and graphical interface to the management terminal 110F for an operator to provide the simulated data to the predictor 134 and from the predictor 134 to the simulator 133.

In an embodiment, the predictor 134 gathers real-time operational data that is fed to the simulator 133 and the simulator 133 matches the patterns to a given model based on the received operational data and reports back to the predictor 134. The predictor 134 then sends suggested changes to staffing and/or physical layout to the management terminal 110F. In an embodiment, the management terminal 110F is a smart phone having a mobile application that serves as an interface for interacting with the predictor 134. In an embodiment, the predictor 134 sends a text message to a phone outside of the management terminal 110F instructing a manager that operates the phone about the suggested changes.

The operational data is continually gathers and monitored and processed by the components 131-134, such that optimizations and dynamic feedback permits changes to the models and predictive behaviors. This creates a dynamic feedback loop and permits machine learning to capture more effective predictive behaviors. In an embodiment, the simulator 133 and predictor 134 run at preconfigured intervals to update the models and behaviors (such as intraday once a day, etc.).

It is noted that the changes can include a number of reservations that can be accepted or is considered optimal given a current working model (pattern) within the environment 110.

In an embodiment, the simulator 133 and the predictor 134 process a Stochastic algorithm that includes executing the simulator 133 with different random seeds (sets of operational data) and measuring the resulting averages for customer wait times, reservations taken, staffing needs, and profitability.

It is noted that the simulator 133 and the predictor 134 can also process, in some embodiments, a statistical aggregation algorithm that generates averages for the metrics and provides recommendations (predictions) based on the averages.

In an embodiment, the simulator 133 can provide a playback feature that permits the management terminal 110F to playback a specific set of operational data having a specific physical layout and visual watch through in interface what is happening in terms of customer wait times, customer throughput, utilization rates, and profitability of the retailer. The interface also permits the playback to be stopped and changes made by the operator of the management terminal 110F to see the predictive changes playout with those changes. In this way, interactive feedback can permit learning by simulator 133 and the predictor 134 as well.

The system 100 permits the behavior of a retailer, such as but not limited to a restaurant, to be captured and stored in an aggregated store 120. The data is processed into operational metrics by the analyzer 131 and modeled into patterns of unique behaviors (traffic patterns, utilization (can include server 130 utilization as well), wait times, profitability) for the metrics by the modeler 132. The simulator 133 and 134 provide the processing to learn and change the models and predict behaviors with real-time occurring operational data or artificially generated or provided operational data. This provides a more scientific, automated, and accurate mechanism to managing resources of a retail environment 110; which heretofore has been based on guessing and intuition only. The simulation can provide both positive and negative effects of artificially provided operational data based on the models (patterns) for the retail environment 110.

These and other embodiments are no discussed with reference to the FIGS. 2-4.

Figure 2:
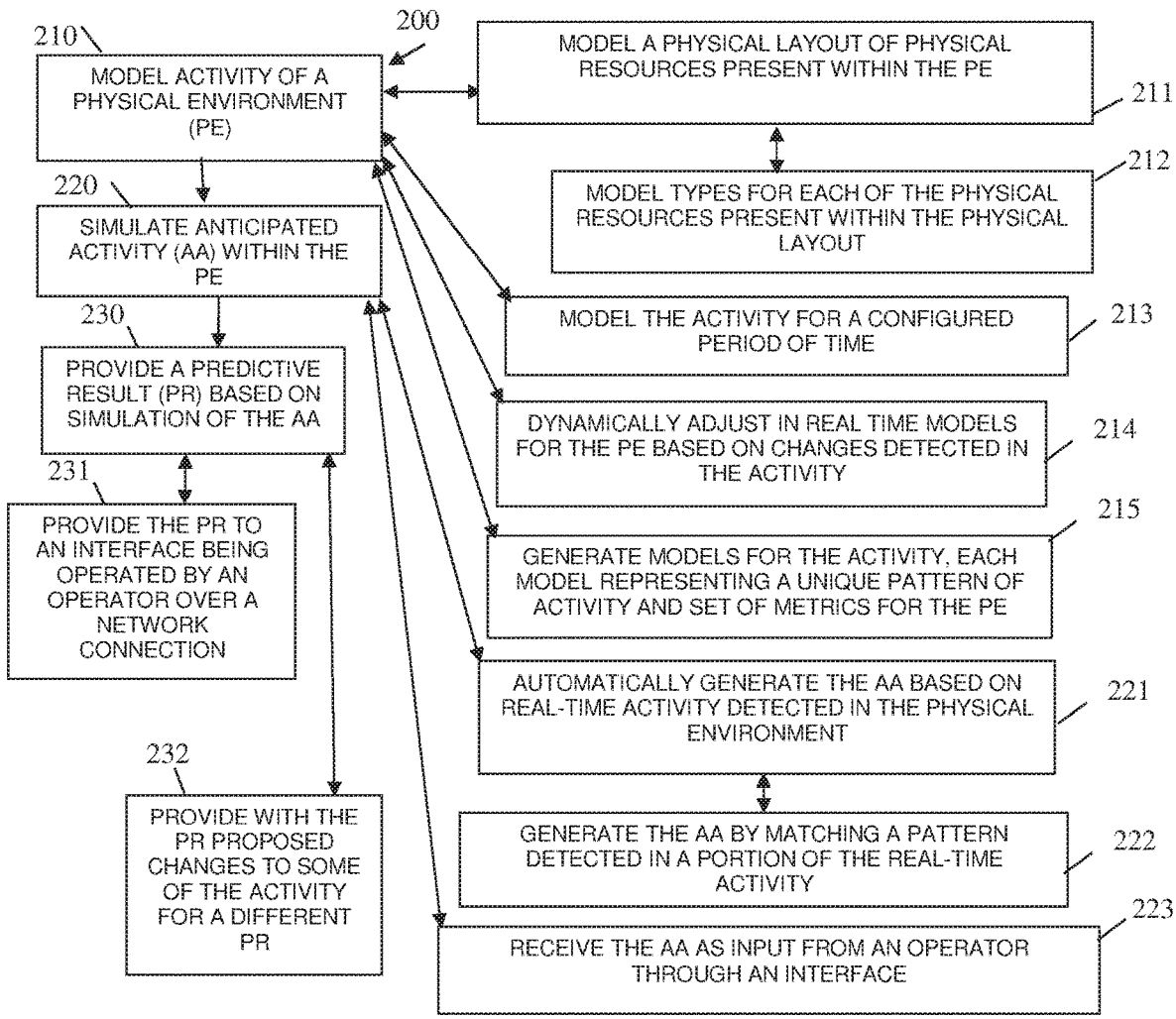
FIG. 2 is a diagram of a method for odeling, simulation, and predictive analysis for a retail environment.

FIG. 2 is a diagram of a method 200 for modeling, simulation, and predictive analysis for a retail environment. The software module(s) that implements the method 200 is referred to as an "environment optimizer." The environment optimizer is implemented as executable instructions programmed and residing within memory and/or a non-transitory computer-readable (processor-readable) storage medium and executed by one or more hardware processors of a hardware computing device. The processors of the device that executes the environment optimizer are specifically configured and programmed to process the environment optimizer. The environment optimizer has access to one or more networks during its processing. The networks can be wired, wireless, or a combination of wired and wireless.

In an embodiment, the device that executes the environment optimizer is a server.

In an embodiment, the device that executes the environment optimizer is the server 130 of the FIG. 1.

In an embodiment, the device that executes the environment optimizer is a cloud processing environment.

In an embodiment, the environment optimizer is some or all of the components 131-134 of the FIG. 1.

At 210, the environment optimizer models activity of a physical environment. The activity is physical activity, such as traffic flow, resource utilization, and the like as discussed above with the FIG. 1.

According to an embodiment, at 211, the environment optimizer models a physical layout of the physical resources present within the physical environment. Here, the physical resources are non-human resources, such as but not limited to, tables, chairs at each table, host desk, POS terminals; and the physical layout is the dimensions of the physical environment and physical location of the physical resources within the environment.

In an embodiment of 211 and at 212, the environment optimizer models types for each of the physical resources within the physical layout, such as table type (capacity), terminal type (POS, kitchen, check-in, etc.), chair type (booth, single, high chair, etc.), and the like.

In an embodiment, at 213, the environment optimizer models the activity for a configured period of time. That is, the environment optimizer uses activity data over an extended period of time to create the models (a reasonable sample size (such as 3-8 weeks).

In an embodiment, at 214, the environment optimizer dynamically adjusts in real time models for the physical environment based on changes detected in the activity.

In an embodiment, at 215, the environment optimizer generate models for the activity, each model representing a unique pattern of activity and set of metrics for the physical environment.

At 220, the environment optimizer simulate anticipated activity within the physical environment. This can be done in the manners discussed above with the FIG. 1.

In an embodiment, at 221, the environment optimizer automatically generate the anticipated activity based on real-time activity detected in the physical environment.

In an embodiment of 221 and at 222, the environment optimizer generate the anticipated activity by matching a pattern detected in a portion of the real-time activity.

In an embodiment, at 223, the environment optimizer receives the anticipated action as input from an operator through an interface.

At 230, the environment optimizer provide a predictive result based on simulation of the anticipated activity.

According to an embodiment, at 231, the environment optimizer provides the predictive result to an interface being operated by an operator over a network connection (such as the connection illustrated in the FIG. 1 to the management terminal 110F).

In an embodiment, at 232, the environment optimizer provides with the predictive result changes to some of the activity for a different predictive result (such as a better results based on comparison of the metrics (better utilization rates and/or better profitability).

Figure 3:
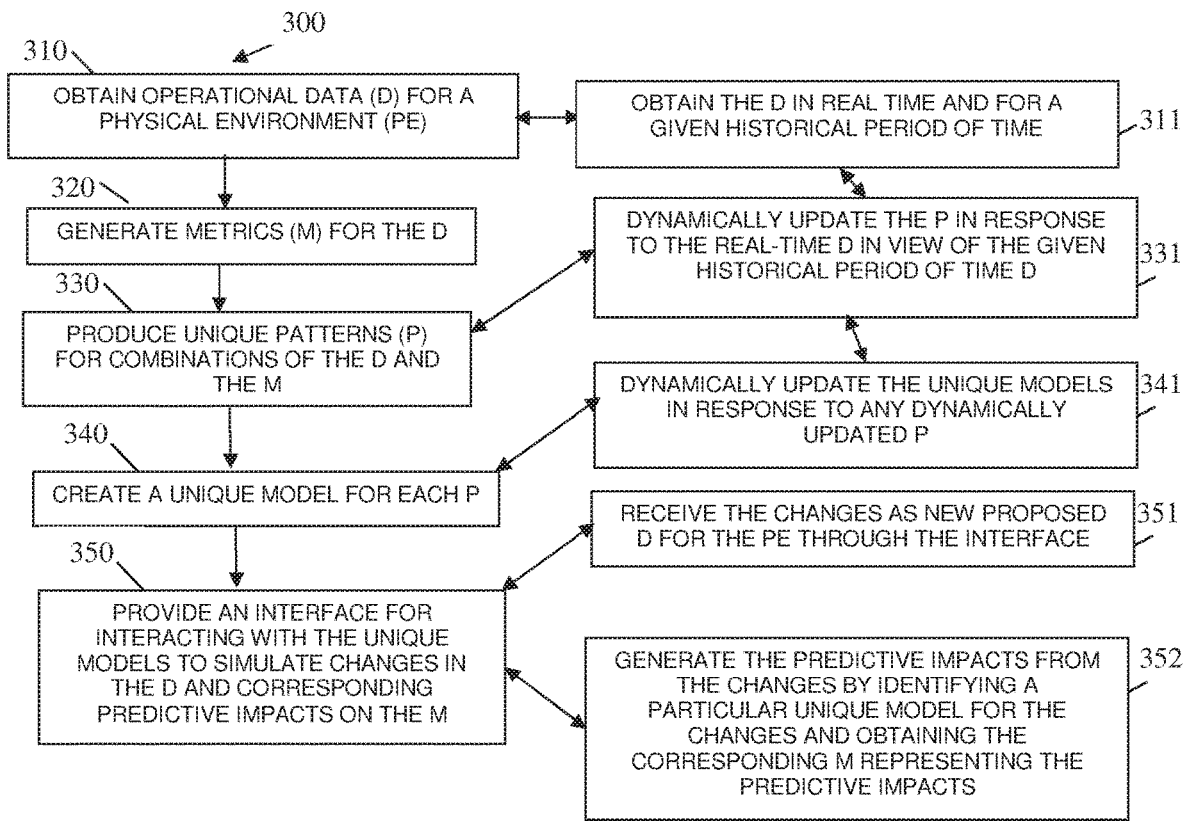
FIG. 3 is a diagram of another method for modeling, simulation, and predictive analysis for a retail environment.

FIG. 3 is a diagram of another method 300 for modeling, simulation, and predictive analysis for a retail environment. The software module(s) that implements the method 300 is referred to as a "site manager." The site manager is implemented as executable instructions programmed and residing within memory and/or a non-transitory computer-readable (processor-readable) storage medium and executed by one or more hardware processors of a hardware device. The processors of the device that executes the site manager are specifically configured and programmed to process the site manager. The site manager has access to one or more networks during its processing. The networks can be wired, wireless, or a combination of wired and wireless.

In an embodiment, the device that executes the site manager is a server.

In an embodiment, the device that executes the site manager is the server 130 of the FIG. 1.

In an embodiment, the device that executes the site manager is a cloud processing environment.

In an embodiment, the site manager is the environment optimizer of the FIG. 2.

In an embodiment, the site manager an enhanced version of the environment optimizer of the FIG. 2.

In an embodiment, the site manager is some or all of the components 131-134 of the FIG. 1.

At 310, the site manager obtains operational data for a physical environment.

In an embodiment, at 311, the site manager obtains the operational data in real time and for a given historical period of time.

At 320, the site manager generates metrics for the operational data.

At 330, the site manager produces unique patterns for combinations of the operational data and the metrics.

In embodiment of 311 and 330, at 331 site manager dynamically updates the patterns in response to the real-time operational data in view of the given historical period of time operational data.

At 340, the site manager creates a unique model for each pattern.

In an embodiment of 331 and 340, at 341, the site manager dynamically updates the unique models in response to any dynamically updated pattern.

At 350, the site manager provides an interface for interacting with the unique models to simulate changes in the operational data and corresponding predictive impacts on the metrics.

In an embodiment, at 351, the site manager receives the changes as new produced operational data for the physical environment through the interface.

In an embodiment, at 352, the site manager generates the predictive impacts from the changes by identifying a particular unique model for the changes and obtaining the corresponding metrics representing the predictive impacts.

Figure 4:
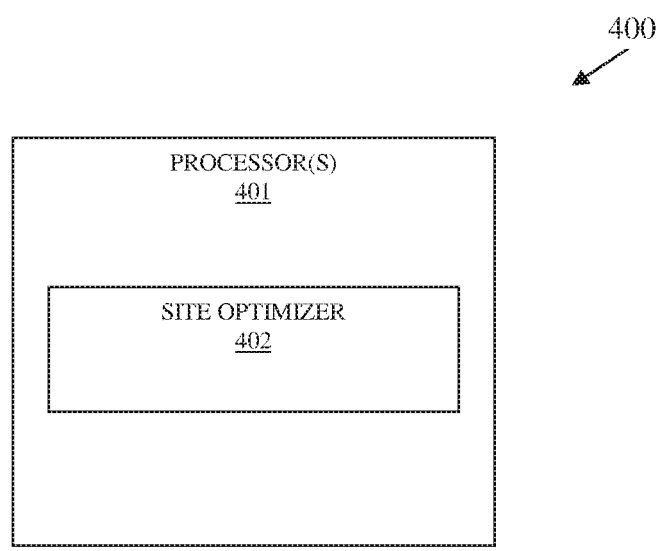
FIG. 4 is a diagram of a system for modeling, simulation, and predictive analysis for a retail environment, according to an example embodiment.

FIG. 4 is a diagram of a system 400 for modeling; simulation, and predictive analysis for a retail environment, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements all, any, or some combination of the processing discussed above with the FIGS. 1-3.

The system 400 includes at least one hardware processor 401 and a site optimizer 402.

In an embodiment, the hardware processor 401 is part of a server.

In an embodiment, the hardware processor 401 is part of the server 130 of the FIG. 1.

In an embodiment, the hardware processor 401 is part of a cloud processing environment.

The site optimizer 402 is configured to: execute on the hardware processor 401, generate models for activity and metrics of a physical environment, simulate changes for proposed activity in the models, and provide impacts to the metrics based on simulation of the changes within the models.

In an embodiment, the physical environment is a restaurant environment.

In an embodiment, the metrics include: profitability, customer traffic flow, table utilization, server utilization, kitchen efficiency, customer wait times, and customer throughput.

In an embodiment, the site optimizer 402 is some or all of the components 131-134 of the FIG. 1.

In an embodiment, the site optimizer 402 is the environment optimizer of the FIG. 2.

In an embodiment, the site optimizer 402 is the site manager of the FIG. 3.

In an embodiment, the site optimizer 402 is a combination of some or all of the processing discussed above with the FIGS. 1-3.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:

providing executable instructions to a processor of a server from a non-transitory computer-readable storage medium causing the processor to perform operations comprising:

modeling activity of a physical environment representing a customer traffic flow and resource utilization as a modeled physical environment that represents physical resources and a physical layout of the physical resources for the physical environment, wherein the modeled physical environment comprises available physical resources, types of physical resources, capacity of the types of physical resources, and known layout patterns of the physical resources within the physical environment;

receiving utilization metrics for customer traffic flow within the physical environment and linking the utilization metrics to given known layout patterns associated with the modeled physical environment;

wherein the utilization metrics comprise seating utilization, employee utilization, customer traffic flow rates, and the corresponding known layout patterns deployed for the physical environment when the utilization metrics were captured;

wherein the customer traffic flow rates comprise specific patterns for a given day of a week and a given calendar day within a given period of time;

wherein the physical resources comprise a total number of available tables, table capacity for each table, a total number of available chairs, and types of the tables;

wherein each given model is associated with a specific physical layout for the physical resources and that given model's corresponding linked utilization metrics;

simulating, by a simulator, anticipated activity within the modeled physical environment using the simulated operational data that changes a given rate associated with the customer traffic flow and using the given known layout patterns for the physical resources of the modeled physical environment, wherein the simulator processes a Stochastic algorithm trained on different random sets of operational data with resulting averages for the random sets of operational data measured against observed operational data associated with observed customer wait times, observed staffing, and observed profitability; and providing a predictive result based on simulating the anticipated activity with the simulated operational data using the Stochastic algorithm;

providing with the predictive result a specific one of the known layout patterns of the modeled physical environment based on the anticipated activity and suggested changes to staffing, wherein the specific one of the known layout patterns includes a change for the physical environment and different allocations of the physical resources from what was currently present in the physical environment that optimizes anticipated utilization metrics for the anticipated activity within the physical environment;

providing an interface that renders a visualization of a playback of a given set of operational data for a given activity of a given customer traffic flow with a given physical layout having given allocations of physical resources and illustrating expected or known utilization metrics within the visualization, wherein the visualization during the playback visually depicts corresponding customer wait times, corresponding customer throughout, corresponding utilization rates, and corresponding profitability for the given physical layout having the given allocations of the physical resources;

visually presenting the visualization within the interface;

receiving a stop instruction from the interface;

stopping the visualization responsive to the receiving of the stop instruction;

receiving a change associated with the given set of operational data for the given customer traffic flow with the given physical layout having the given allocations;

visually presenting a second visualization within the interface that illustrates predictive changes to the expected or known utilization metrics with the change along with additional suggested changes to staffing; and continuously iterating back to the modeling and the receiving of the utilization metrics at preconfigured intervals of time by gathering and monitoring current operational data, creating a dynamic feedback loop that processes changes to the modeled physical environment based on current traffic flow in a given interval and current utilization metrics in the given interval along with updated linkages to a current corresponding known layout pattern.

2. The method of claim 1, wherein modeling further includes modeling types for each of the physical resources present within the physical layout.

3. The method of claim 1, wherein modeling further includes modeling the activity for a configured period of time.

4. The method of claim 1, wherein modeling further includes dynamically adjusting in real time models for the physical environment based on changes detected in the activity.

5. The method of claim 1, wherein modeling further includes generating models for the activity, each model representing a unique pattern of activity and set of metrics for the physical environment.

6. The method of claim 1, wherein simulating further includes automatically generating the anticipated activity based on real-time activity detected in the physical environment.

7. The method of claim 6, wherein automatically generating further includes generating the anticipated activity by matching a pattern detected in a portion of the real-time activity.

8. The method of claim 1, wherein generating further includes receiving the anticipated activity as input from an operator through the interface.

9. The method of claim 1, wherein providing the predictive result further includes providing the predictive result to an interface being operated by an operator over a network connection.

10. The method of claim 1, wherein providing the predictive further includes providing with the predictive result proposed changes to some of the activity for a different predictive result.

11. A server, comprising:

a hardware processor;

non-transitory computer-readable storage medium having executable instructions representing as a site optimizer;

a site optimizer when executed by the hardware processor from the non-transitory computer-readable storage medium cause the hardware processor to:

obtain the executable instructions for the site optimizer;

process the executable instructions to perform processing comprising:

generating models for activity and metrics of a physical environment, wherein the activity associated with customer traffic flow and resource utilization during the customer traffic flow, each model including a specific physical layout pattern of physical resources for the physical environment, and specific allocations of the physical resources based on types of physical resources within the specific physical layout pattern along with utilization metrics for the physical resources with the corresponding model, wherein the utilization metrics comprise seating utilization, employee utilization, customer traffic flow rates, and the modeled physical environment with specific physical layout pattern of particular resources deployed for the physical environment when the utilization metrics were captured, wherein the customer traffic flow rates comprise specific patterns for a given day of a week and a given calendar day within a given period of time;

wherein the physical resources comprise a total number of available tables, table capacity for each table, a total number of available chairs, and types of the tables;

simulating, by a simulator, changes for a proposed activity in the models using simulated operational data, wherein the simulator processes a Stochastic algorithm trained on different random sets of operational data with resulting averages for the random sets of operational data measured against observed operational data associated with observed customer wait times, observed staffing, and observed profitability;

providing impacts to the metrics based on simulation of the changes within the models, wherein the impacts at least include utilization rates of the physical resources;

providing a different physical layout pattern from a current physical layout pattern selected from known physical layout patterns, wherein the different physical layout pattern is selected from the known physical layout patterns and includes different physical resource allocations from current physical resource allocations based on the impacts to achieve optimal utilization metrics;

providing an interface that renders a visualization of a playback of a given set of operational data for a given activity of a given customer traffic flow with a given physical layout pattern having given allocations of physical resources and illustrating expected or known utilization metrics within the visualization along with suggested changes to staffing, wherein the visualization during the playback visually depicts corresponding customer wait times, corresponding customer throughout, corresponding utilization rates, and corresponding profitability for the given physical layout having the given allocations of the physical resources;

visually presenting, the visualization within the interface;

receiving a stop instruction from the interface;

stopping the visualization responsive to the receiving of the stop instruction;

receiving, by the executable instructions, a change associated with the given set of operational data for the given customer traffic flow with the given physical layout pattern having the given allocations;

visually presenting a second visualization within the interface that illustrates predictive changes to the expected or known utilization metrics with the change along with additional changes to staffing; and continuously iterating back to the generating at preconfigured intervals of time by gathering and monitoring current operational data, creating a dynamic feedback loop that processes changes to the physical environment based on a current customer traffic flow rate in a given interval and current utilization metrics in the given interval along with updated linkages to a current specific physical layout pattern in the given interval.

12. The server of claim 11, wherein the physical environment is a restaurant environment.

13. The server of claim 12, wherein the metrics include: profitability, customer traffic flow rates, table utilization, server utilization, kitchen efficiency, customer wait times, and customer throughput.

* * * * *